United States Patent
Andueza

(10) Patent No.: US 11,236,828 B2
(45) Date of Patent: Feb. 1, 2022

(54) METAL AIRTIGHT SEAL WITH BIDIRECTIONAL FACE, SELF-ENERGIZABLE BY PRESSURE

(71) Applicant: FMC TECHNOLOGIES DO BRASIL LTDA, Rio de Janeiro (BR)

(72) Inventor: Alejandro Andueza, Rio de Janeiro (BR)

(73) Assignee: FMC TECHNOLOGIES DO BRASIL LTDA, Rio de Janeiro (BR)

(*) Notice: Subject to any disclaimer, the term of this patent is extended or adjusted under 35 U.S.C. 154(b) by 136 days.

(21) Appl. No.: 16/319,865

(22) PCT Filed: Jul. 19, 2017

(86) PCT No.: PCT/BR2017/050197
§ 371 (c)(1),
(2) Date: Jan. 23, 2019

(87) PCT Pub. No.: WO2018/018118
PCT Pub. Date: Feb. 1, 2018

(65) Prior Publication Data
US 2019/0264810 A1    Aug. 29, 2019

(30) Foreign Application Priority Data

Jul. 26, 2016 (BR) .................. BR1020160172969
Jul. 10, 2017 (BR) .................. BR1320170148512

(51) Int. Cl.
*F16J 15/32* (2016.01)
*F16J 15/08* (2006.01)

(52) U.S. Cl.
CPC .................. *F16J 15/08* (2013.01)

(58) Field of Classification Search
CPC .................. F16J 15/08; F16J 15/0881
See application file for complete search history.

(56) References Cited

U.S. PATENT DOCUMENTS

| 1,721,325 A | 7/1929 | Wilson |
| 3,047,300 A | 7/1962 | Taylor et al. |

(Continued)

FOREIGN PATENT DOCUMENTS

| EP | 2494195 B1 | 8/2014 |
| FR | 1356218 A | 3/1964 |

(Continued)

OTHER PUBLICATIONS

International Search Report issued in International Application No. PCT/BR2017/050197, dated Oct. 3, 2017 (3 pages).

(Continued)

*Primary Examiner* — Gilbert Y Lee
(74) *Attorney, Agent, or Firm* — Osha Bergman Watanabe & Burton LLP

(57) ABSTRACT

A metal airtight seal with bidirectional face, self-energizable by pressure, with axisymmetric or non-axisymmetric configuration, has teeth guided at acute angles, both towards the center of the ring and outside, radially. This geometry may provide the airtight seal the characteristic of being self-energizable by fluid pressure and providing bidirectional sealing, both to the internal pressure and to the external pressure. Furthermore, second element of the airtight seal has a course stopper, to limit the deformation of said metal airtight seal. First and third elements of the airtight seal provide the airtight seal high resistance against internal and external pressure, due to the control of radial slacks.

15 Claims, 4 Drawing Sheets

(56) References Cited

U.S. PATENT DOCUMENTS

| | | | |
|---|---|---|---|
| 3,047,301 A | | 7/1962 | Taylor et al. |
| 4,582,330 A | | 4/1986 | Lew et al. |
| 4,787,642 A | | 11/1988 | Etheridge |
| 9,551,420 B2 * | | 1/2017 | Armitage ............... F16J 15/025 |
| 2002/0140184 A1 | | 10/2002 | Janoff et al. |
| 2007/0287317 A1 | | 12/2007 | Reum et al. |
| 2015/0316150 A1 | | 11/2015 | Zhao et al. |

FOREIGN PATENT DOCUMENTS

| | | |
|---|---|---|
| GB | 246554 A | 1/1926 |
| WO | 2013054050 A1 | 4/2013 |
| WO | 2016040569 A1 | 3/2016 |

OTHER PUBLICATIONS

Written Opinion issued in International Application No. PCT/BR2017/050197, dated Oct. 3, 2017 (3 pages).

Extended European Search Report issued in corresponding European Application No. 17833123.7; dated Mar. 3, 2020.

Office Action issued in corresponding European Application No. 17833123.7; dated Jan. 22, 2021 (5 pages).

* cited by examiner

METAL AIRTIGHT SEAL WITH BIDIRECTIONAL FACE, SELF-ENERGIZABLE BY PRESSURE

FIELD OF THE INVENTION

The invention refers to a new metal hermetic seal structure with bidirectional face, self-energizable by pressure, being said seal used for the isolation of liquid or gaseous fluids, especially in the oil and gas industry, being able to operate both under low and high pressures and in conditions of high and low temperatures. However, we highlight that, due to the high range of admissible pressure values, the use of the seal of the invention is not limited to the oil and gas fields, and it may be applied in any other sealing system, be it submarine or on surface, as present in the numerous fields of engineering.

BACKGROUND OF THE INVENTION

As it is well known among the experts in the art, metal airtight face seals are widely used in equipment requiring the separation of two regions under different pressure. Especially in the oil and gas industry, special seals are required, considering the high order of magnitude of acting pressures in that field of industry, which may reach up to 30,000 psi.

For that purpose, numerous enhancements have been observed in the field. In its majority, we can highlight the use in submarine equipment of face seals standardized by API (American Petroleum Institute) for various classes of pressure. Said seals are of the ring type and, as a few examples as widely known and used by the experts in the art, we can mention those of the "R", "RX" and "BX" types.

They are widely used for sealing of API flanges, but they are not self-energizable by pressure, being thus extremely dependent on the pre-load of the connection as applied between the constituents to guarantee the sealing as required. The device used for this kind of sealing uses the principle of plastic deformation of the seal material, requiring high loads to energize and maintain sealing in the working loads of the equipment.

Therefore, the document US 2002140184A1 discloses a ring for metal-metal sealing for use in well heads, besides having other applications. The conception as used for that sealing was based on the separation of the structural element from the sealing element. That separation has enabled the use of smoother metal alloys, which may be introduced to the structural element, e. g. by pressure. That conception also enabled the re-use of rings, merely by exchanging the sealing element. Other clear aspects for the experts in the art are higher resistance against corrosion, use of low steel alloys and protection for the sealing element by the structural element against pressure.

The document US 2015316150A1 also shows a metal sealing ring. The conception used in that case was the adoption of a tooth geometry, similar to the shape of a "fish bone", with the teeth in acute angles turned to the source of pressure and with rounded contact surfaces.

However, in the documents as mentioned and examples in the state of the art, there is still no solution comprising all the demands as required for a sealing of that kind, notably concerning energization and bidirectional operation.

BRIEF DESCRIPTION OF THE INVENTION

Therefore, it is the main object of the invention to provide a new structural conception of a metal-metal face airtight seal advantageously solving the deficiencies in the state of the art, and cumulatively presenting advantages for its self-energization being reached both by the action of internal pressure and by external pressure coming from the hydrostatic column, i. e. bidirectional energization.

According to the invention, a new structural conception of a metal airtight seal with a face with an similar shape to a "fish bone", but with the peculiarity of having teeth guided at acute angles both to outside and to inside the ring, radially, making it become a bidirectional seal.

As will be appreciated, this new conception grants to the metal face airtight seal, object of the invention, the characteristic of being self-energizable both at internal pressure and at external pressure, coming from the hydrostatic column and from another source of pressure.

Furthermore, the airtight seal of the invention also comprises two assembling options, each one with its specific advantages, also covering other characteristics such as low production and assembly costs and low assembly load, besides being very resistant at high pressures as usually present in submarine applications, among others.

The airtight seal and its respective lodging have, in a simple version, axisymmetric geometry, but, depending on the project, the airtight seal may present a non-axisymmetric configuration.

BRIEF DESCRIPTION OF THE DRAWINGS

The metal airtight seal with bidirectional face, self-energizable by pressure of the invention may be well understood from the illustrative drawings as attached, which represent, schematically and not limiting its scope.

DETAILED DESCRIPTION OF THE INVENTION

Figure 1:
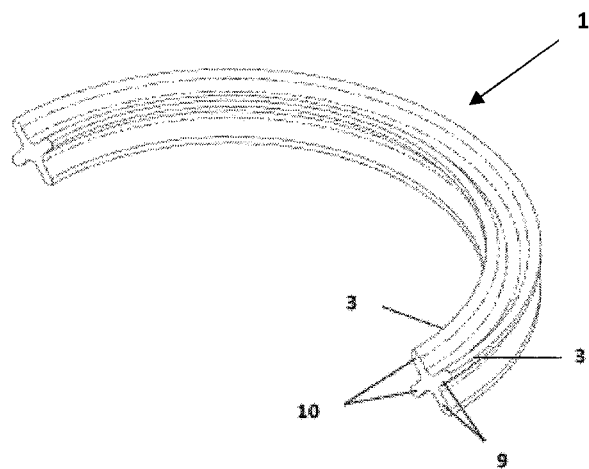
FIG. 1: perspective view of a section of the metal airtight seal with bidirectional face, self-energizable by pressure of the invention.
Figure 2:
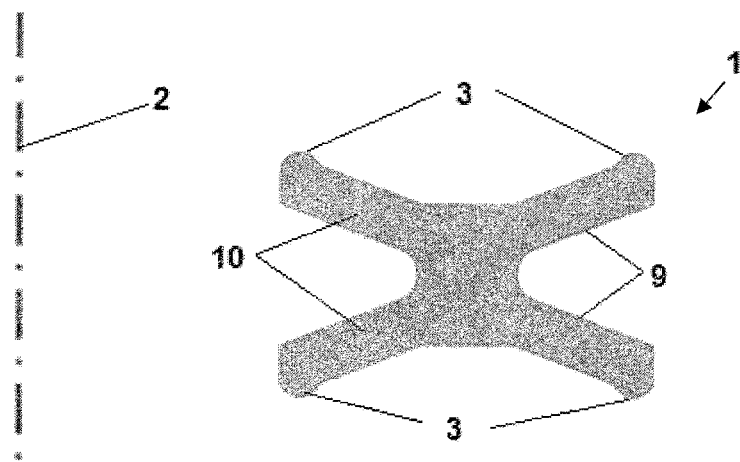
FIG. 2: schematic front view of the geometry of the crosswise section of the metal airtight seal of the invention.

In a first aspect, according to FIG. 1, the invention provides a metal airtight seal with bidirectional face, self-energizable by pressure, having a new geometry comprising two kinds of teeth, being a first kind of teeth (10) guided at acute angles radially towards the center of the seal and a second kind of teeth (9) guided at acute angles, radially towards outside the seal. Said metal airtight seal with bidirectional face, self-energizable by pressure of the invention is also defined by protuberances as provided at the upper edges of the teeth (9) and (10), determining regions (3). Furthermore, as we can see from FIG. 2, the metal airtight seal with bidirectional face, self-energizable by pressure, has axisymmetric geometry over the axis (2) passing through its center in a simplified version. Therefore, that new structure grants to the metal airtight seal with bidirectional face of the invention the characteristic of being self-energizable by fluid pressure, both at internal pressure and at external pressure, the latter one coming from the hydrostatic column or from any other source of pressure.

Figure 3:
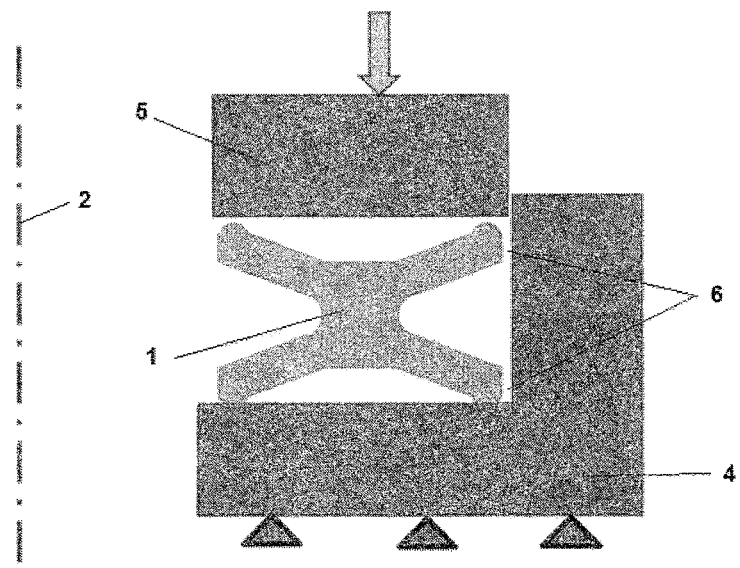
FIG. 3: view of a schematic crosswise section of a first option of assembly of the metal airtight seal of the invention.

In a second aspect, the first assembling option of the metal airtight seal with bidirectional face, self-energizable by pressure of the invention is embodied as shown by FIG. 3. The element (4) has a groove for assembling the airtight seal (1), wherein the element (5) presses said airtight seal (1) at a given pre-defined value in the project, so to guarantee better pre-load for its assembly. The elements (4) and (5) form a pod, partially covering the airtight seal (1), wherein said element (5) also has a course-limiting stopper, so to limit the deformation of said airtight seal (1).

That first assembling option grants to the airtight seal (1) of the invention high resistance against internal pressure due to the control of the maximum radial slack (6) between said airtight seal (1) and the wall of the groove of the element (4). Said application of internal pressure produces radial displacement of the seal until filling the radial slack (6), producing, from that moment, stiffening from the contribution of rigidity of the part (4) to the airtight seal (1).

Figure 4:
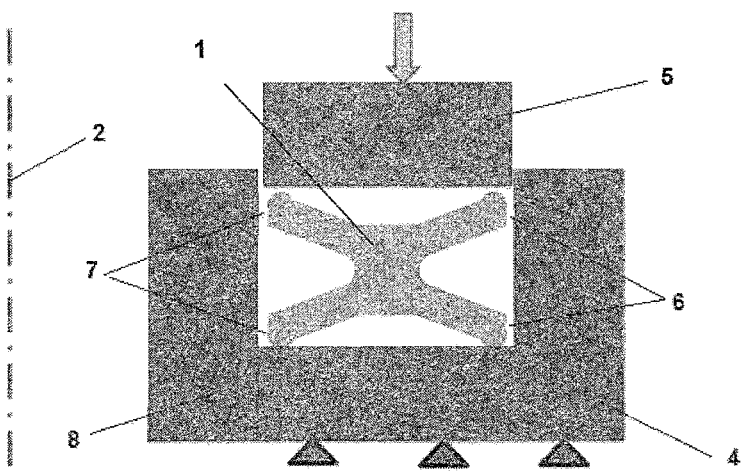
FIG. 4: view of a schematic crosswise section of a second option of assembly of the metal airtight seal of the invention.

In a third aspect, according to FIG. 4, the invention also provides a second assembling option, with the elements (4), (5) and (8) forming a pod for the airtight seal (1), fully covering it. This second assembling option presents the same advantage of the first assembling option concerning internal pressure, but has better behavior upon the application of external pressure, due to the use of the same stiffening conception, limiting the maximum radial slack (7) to the internal diameter of the seal regarding the element (8).

Figure 5:
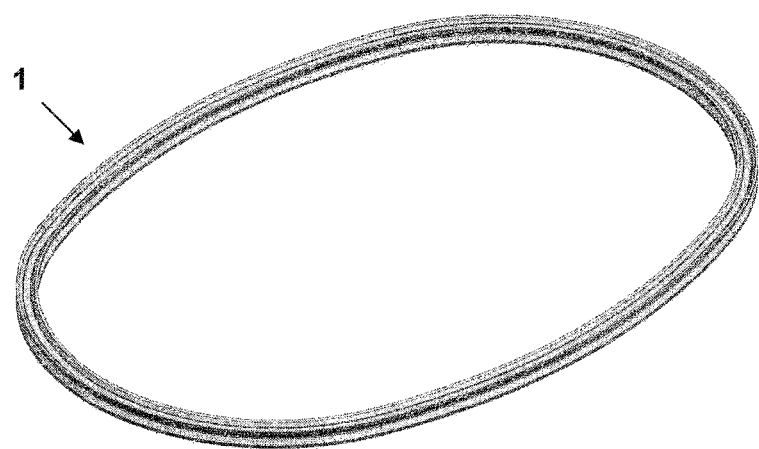
FIG. 5: perspective view of the airtight seal of the invention, according to an alternative embodiment.
Figure 6:
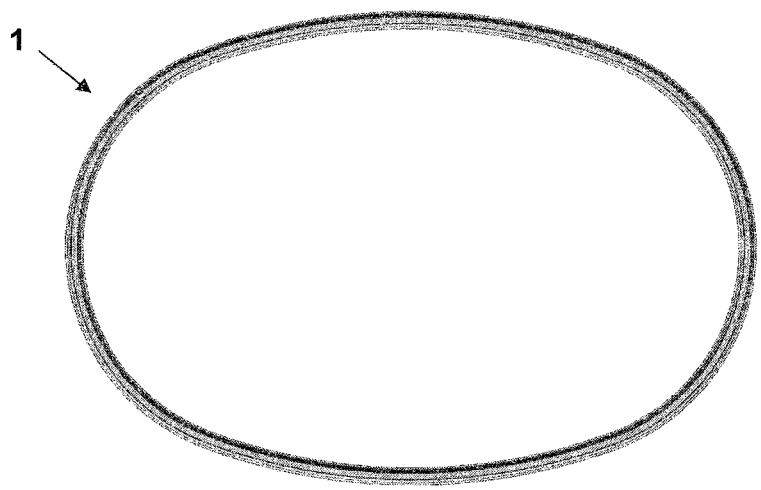
FIG. 6: upper view of the airtight seal as shown by FIG. 5.
Figure 7:
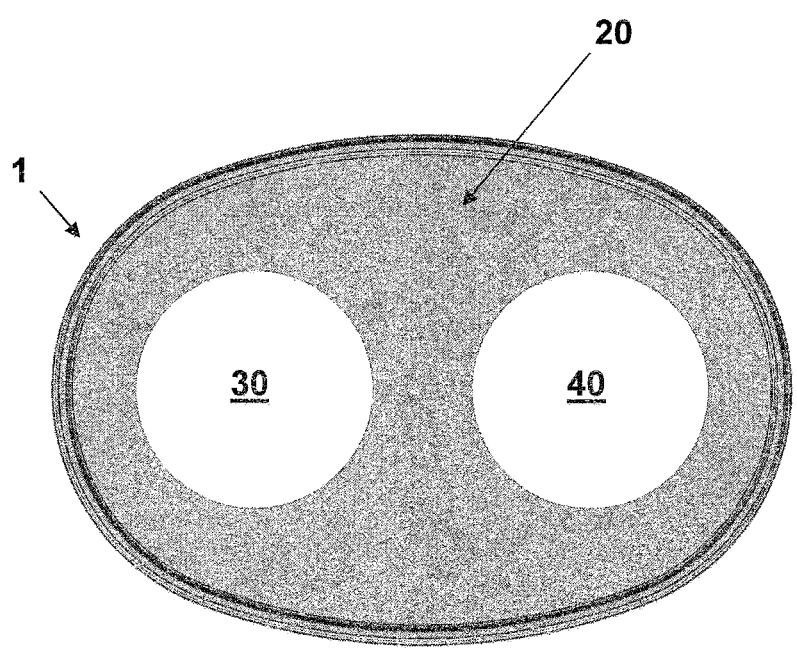
FIG. 7: upper view of an application of the airtight seal as shown by FIG. 5.

In given design situations, the use of a non-axisymmetric airtight seal with geometric configuration which may be convex or non-convex may be advantageous. Therefore, the invention also covers a configuration of a non-axisymmetric airtight seal (1) over the axis (2), as shown by FIGS. 5, 6 and 7. Said configuration may be used in convex geometries, such as elliptical, or any other geometry, even if not fully convex. That variation of embodiment of the airtight seal of the invention allows significant savings of raw material, since an airtight seal with elliptical or another kind of convex geometry requires less space than a circular seal. We should also add to this advantageous aspect of this embodiment, the advantage concerning the apparent reduction of costs, notably when applied to a face sealing (20) with more than one orifice (30, 40). An example of this application is shown by FIG. 7.

Therefore, the experts in the art will also appreciate that the geometry of the metal airtight seal with bidirectional face, self-energizable by pressure (1), embodied for use in submarine equipment, aiming to separate fluids, allows to change the system for fixing the bonnet to the block of submarine valves, with the consequent exclusion of prisoners. That possibility brings in substantially lower production and assembling costs than those costs as imposed by airtight seals of the state of the art. Furthermore, another great advantage as provided by the invention refers to the use of the metal airtight seal with bidirectional face, self-energizable by pressure in a predominantly elastic form, with plastic deformation of the material just in a few locations, significantly reducing the assembly load of the sealing element.

Furthermore, considering all the advantages as mentioned herein, the experts in the art will conclude that the metal airtight seal with bidirectional face, self-energizable by pressure of the invention is not solely applicable to the oil and gas industry, and may be used for any application requiring sealing to separate fluids in regions with different pressures, both in submarine and terrestrial environments, in any field of engineering.

The invention claimed is:

1. A metal airtight seal with bidirectional face, self-energizable by pressure, the seal being of a ring type with a four-toothed geometry having only four teeth, comprising two teeth guided at a first acute angle radially towards a center axis of the ring type seal, the first acute angle defining an angle between the two teeth guided radially towards the center axis, and two teeth guided at a second acute angle radially towards outside the ring type seal, the second acute angle defining an angle between the two teeth guided radially towards outside the ring type seal, each tooth of the two teeth guided at the first acute angle radially towards the center axis of the seal and the two teeth guided at the second acute angle radially towards outside the ring comprising a rounded protuberance formed on an edge of each tooth and extending parallel to the center axis, the protuberances of the seal defining regions of different pressures.

2. The airtight seal of claim 1, further comprising a face sealing region defined by the regions defined by the protuberances.

3. The airtight seal of claim 1, wherein an arrangement of the teeth guided at the first acute angle radially towards the center axis of the seal and the teeth guided at the second acute angle radially towards outside the ring makes sealing bidirectional, both against internal pressure applied form inside of the ring type seal and against external pressure applied from outside of the ring type seal.

4. The airtight seal of claim 1, wherein a geometry of the seal provides the characteristic of being self-energizable by pressure.

5. The airtight seal of claim 1, further comprising a first element having a groove for assembling said airtight seal on a second element, to form a pod partially covering said airtight seal.

6. The airtight seal of claim 5, wherein during the assembly, a maximum radial slack is controlled between said airtight seal and a wall of the groove of said first element, to provide high resistance against internal pressure.

7. The airtight seal of claim 5, wherein the second element has a stopper to limit deformations of said airtight seal.

8. The airtight seal of claim 1, further comprising a first element having a groove for assembling said airtight seal, the first element, a second element and a third element forming a pod fully covering said airtight seal.

9. The airtight seal of claim 8, wherein a maximum radial slack is controlled between said airtight seal, the third element and a wall of the groove of the first element, to provide high resistance against external pressure.

10. The airtight seal of claim 8, wherein the second element has a stopper to limit deformations of the airtight seal.

11. The airtight seal of claim 1, wherein the airtight seal is predominantly working in the elastic regimen of a material of the seal, so that plastic deformation only occurs in given locations, thus reducing the pre-load as required for assembling the system.

12. The airtight seal of claim 1, wherein the airtight seal has an axisymmetric configuration over the axis.

13. The airtight seal of claim 1, wherein the airtight seal has a non-axisymmetric configuration over the axis, with convex or non-convex geometry.

14. The airtight seal of claim 1, wherein the airtight seal has an elliptical form.

15. The airtight seal of claim 1, wherein the airtight seal is used in mechanical systems requiring the separation of two regions under different pressure.

\* \* \* \* \*